(12) United States Patent
Huber

(10) Patent No.: US 8,525,095 B2
(45) Date of Patent: Sep. 3, 2013

(54) NANOTHERMOCOUPLE DETECTOR BASED ON THERMOELECTRIC NANOWIRES

(75) Inventor: Tito E. Huber, Washington, DC (US)

(73) Assignee: Howard University, Washington, DC (US)

( * ) Notice: Subject to any disclaimer, the term of this patent is extended or adjusted under 35 U.S.C. 154(b) by 0 days.

(21) Appl. No.: 13/321,365

(22) PCT Filed: May 19, 2010

(86) PCT No.: PCT/US2010/035426
§ 371 (c)(1),
(2), (4) Date: Nov. 18, 2011

(87) PCT Pub. No.: WO2010/135439
PCT Pub. Date: Nov. 25, 2010

(65) Prior Publication Data
US 2012/0062317 A1  Mar. 15, 2012

Related U.S. Application Data

(60) Provisional application No. 61/179,626, filed on May 19, 2009.

(51) Int. Cl.
*H03F 3/08* (2006.01)
(52) U.S. Cl.
USPC ............... 250/214 A; 977/954; 977/955
(58) Field of Classification Search
USPC ............... 250/214 A; 977/954, 955
See application file for complete search history.

(56) References Cited

U.S. PATENT DOCUMENTS

| 4,166,243 A | * | 8/1979 | West et al. .................. 324/537 |
| 5,328,853 A |   | 7/1994 | Huber et al. |
| 5,389,812 A |   | 2/1995 | Huber et al. |
| 5,421,396 A |   | 6/1995 | Huber et al. |
| 5,998,874 A |   | 12/1999 | Huber et al. |

(Continued)

FOREIGN PATENT DOCUMENTS

| WO | 2007038600 A2 | 4/2007 |
| WO | WO 2008082186 A1 * | 7/2008 |

OTHER PUBLICATIONS

Written Opinion of the International Searching Authority, International Application No. PCT/US2010/035426, dated Jan. 25, 2011, 5 pages.

(Continued)

*Primary Examiner* — Thanh Luu
(74) *Attorney, Agent, or Firm* — Fitch, Even, Tabin & Flannery LLP

(57) ABSTRACT

A nanothermocouple detector includes a nanowire coupled across two electrodes. The two electrodes are electrically connected to an amplifier. The two electrodes generally have a separation of about five micrometers to about thirty micrometers across which the nanowire is coupled. A focusing element is disposed to admit photons that fall on the focusing element onto the nanowire to heat it. A voltage change across the nanowire caused by the heating of the nanowire by the light is detected by the amplifier. The voltage change corresponds to the energy absorbed from the light by the nanowire. The color of a single photon can be detected using such device. An array of such devices can be used for sensing light on a two-dimensional scale, thereby providing an image showing small variances in the energies of the light impinging upon the detector array.

17 Claims, 2 Drawing Sheets

(56) References Cited

U.S. PATENT DOCUMENTS

| | | | |
|---|---|---|---|
| 6,996,147 B2 | 2/2006 | Majumdar et al. | |
| 8,178,842 B2* | 5/2012 | Bratkovski et al. | 250/338.1 |
| 2002/0125430 A1* | 9/2002 | Wood | 250/338.1 |
| 2008/0272302 A1* | 11/2008 | Frey et al. | 250/336.2 |
| 2008/0310790 A1 | 12/2008 | Wu et al. | |

OTHER PUBLICATIONS

Cho, Han Sol.; Korean Search Report for PCT/US2010/035426 dated Jan. 25, 2011; 3 pages.

Gol'tsman, G.N., et al.; "Picosecond Superconducting Single-Photon Optical Detector"; Applied Physics Letters; Aug. 2001, vol. 79, No. 6; pp. 705-707.

Jones, P., et al.; "Electrical Contact Resistance of Bismuth Telluride Nanowires"; 25th International Conference on Thermoelectrics, Vienna: IEEE, 6-10; Aug. 2006; pp. 693-696.

Miki; S., et al.; "Large Sensitive-Area NbN Nanowire Superconducting Single-Photon Detectors Fabricated on Single-Crystal MgO Substrates"; Applied Physics Letters; Feb. 2008, vol. 92, No. 6; 3 pages.

Rogalski, A.; "HgCdTe Infrared Detector Material: History, Status and Outlook"; Institute of Physics Publishing; Rep. Prog. Phys. 68 (2005), 2267-2336.

Schieferdecker, J., et al.; "Infrared Thermopile Sensors with High Sensitivity and Very Low Temperature Coefficient"; Sensors and Actuators; A46-47, 422-427 (1995).

Hochbaum, A., et al.; "Enhanced Thermoelectric Performance of Rough Silicon Nanowires"; Nature, vol. 451, Jan. 2008; 6 pages.

Grossman, E., et al.; "Lithographic Spiral Antennas at Short Wavelengths"; Appl. Phys. Lett., vol. 59 (1991); 3 pages.

Chong, N., et al.; "Antenna-Coupled Polycrystalline Silicon Air-Bridge Thermal Detector for Mid-Infrared Radiation"; Appl. Phys. Lett., vol. 71 (1997); 3 pages.

Huber, C.A., et al.; "Nanowire Array Composites"; Science, vol. 263, Feb. 11, 1994; 4 pages.

Huber, T.E., et al.; "Confinement Effects and Surface Charge Carriers in Bi Quantum Wires"; Appl. Phys. Lett., vol. 84 (2004); 15 pages.

Nikolaeva, A., et al.; "Quantum Interference of Surface States in Bismuth Nanowires Probed by the Aharonov-Bohm Oscillatory Behavior of the Magnetoresistance"; Physical Review, vol. B77, (2008); 30 pages.

Huber, T.E., et al.; "Observation of Three-Dimensional Behavior in Surface States of Bismuth Nanowires and the Evidence for Bulk Bi Charge Fractionalization"; Accepted Physical Review Rapid Communications; Apr. 1, 2009; 18 pages.

Ayres, V.M., et al.; "Electronic Transport Characteristics of Gallium Nitride Nanowire-Based Nanocircuits"; 2006 IEEE; 4 pages.

Ayres, V.M., et al.; "Investigations of Heavy Ion Irradiation of Gallium Nitride Nanowires and Nanocircuits"; ScienceDirect, Diamond & Related Materials 15 (2006); 1117-1121; 5 pages.

Huber, T.E., et al; "Quantum Confinement and Surface-State Effects in Bismuth Nanowires"; ScienceDirect, 2006 published by Elsevier B.V.; 6 pages.

Huber, T.E., et al; "Role of Boundary Roughness in the Electronic Transport of Bi Nanowires"; Journal of Applied Physics, vol. 104; 2008 American Institute of Physics; 9 pages.

Jacobs, B.W., et al; "Electron Transport in Zinc-Blende Wurtzite Biphasic Gallium Nitride Nanowires and GaNFETs"; Nanotechnology, vol. 18, 2007; published Oct. 19, 2007; 7 pages.

Jacobs, B.W., et al; "Electronic and Structural Characteristics of Zinc-Blende Wurtzite Biphasic Homostructure GaN Nanowires"; Nano Letters, vol. 7, No. 5, 1435-1438, 2007; 4 pages.

Nikolaeva, A. et al.; "Diameter-Dependent Thermopower of Bismuth Nanowires"; Work Supported by Civilian Research and Development Foundation for the Independent States of the Former Soviet Union and Division of Materials Research of the U.S. National Science Foundation under Grant No. NSF-0611595 and NSF-0506842; 2008; 32 pages.

* cited by examiner ions of US 8,525,095 B2

NANOTHERMOCOUPLE DETECTOR BASED ON THERMOELECTRIC NANOWIRES

RELATED APPLICATION(S)

This application is the National Stage of International Application No. PCT/US2010/035426 filed May 19, 2010, which claims the benefit of U.S. Provisional application No. 61/179,626, filed May 19, 2009, each of which is incorporated by reference in its entirety herein.

STATEMENT REGARDING FEDERALLY SPONSORED RESEARCH OR DEVELOPMENT

This invention was made with government support under DMR-0506842 "Study of the Fermi Surface of Bismuth Nanowires" awarded by National Science Foundation. Division of Materials Research and under DAAD19-02-1-0303 376,999 "Electronic Control of Bi Nanowires" awarded by Army Research Office, Division of Materials. The government has certain rights in the invention.

TECHNICAL FIELD

This invention relates generally to sensing light energy, and more particularly to using a nanowire to detect photon energy.

BACKGROUND

Quantum sensing of light or the detection of single photons is well known and is achievable in many devices. Photons are single light elements, and detection of the energy of single photons can be desirable in several settings. Phototubes, photomultipliers, avalanche solid state photodiodes, and HgCdTe detectors are all quantum detectors that can, broadly, be classified as photon-counting and photon-number-resolving detectors. Such detectors can in some instances be set-up as heterodyne detectors (which detect interference in laser light moving between a local source and returning laser light). Because the detection in such devices is done through electric charge, without multiplexing, these detectors are color blind. For example, in a HgCdTe detector, detection occurs when an infrared photon of sufficient energy kicks an electron from the valence band to the conduction band. Such an electron is collected by a suitable external readout circuit and transformed into an electric signal. Once the electron is in the valence band, the energy information of the electron is lost because the electron energy is thermalized by collisions in the valence band.

A bolometer is another energy detection device. In contrast to the devices described above, in a bolometer, light heats up a tiny piece of material. The bolometer then operates like a calorimeter, measuring power. The temperature change of the bolometer is measured and transformed into an electric signal. Known bolometer devices, however, cannot resolve energies of a single photon to determine photon color because the sensing element or device heat capacity or size obscures finer energy variations.

BRIEF DESCRIPTION OF THE DRAWINGS

The above needs are at least partially met through provision of the nanothermocouple detector based on thermoelectric nanowires described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a nanothermocouple detector includes a nanowire coupled across two electrodes. The two electrodes, in turn are electrically connected to an amplifier. The two electrodes generally have a separation of about five micrometers to about thirty micrometers across which the nanowire is coupled. A focusing element is disposed to admit photons that fall on the focusing element onto the nanowire to heat it. A voltage change across the nanowire due to the heating is detected by the amplifier. The voltage change corresponds to the energy absorbed from the light by the nanowire.

So configured, given the physical properties of the nanowire, energy sensitivities in sensing the light are increased. For example, the color of a single photon can be detected using such device. Difficulties in scaling a bolometer to such a scale are overcome through use of the focusing element. In various approaches, scaling difficulties are further addressed through locating the impinging light on particular portions of the nanowire based sensor. Configurations of the nanowire and electrodes also improve the ability to reduce the size of the sensor to achieve the described energy sensitivities.

Moreover, an array of such devices can be used for sensing light on a two-dimensional scale, thereby being able to provide an image showing small variances in the energies of the light impinging upon the detector array. These and other benefits may be clearer upon making a thorough review and study of the following detailed description.

Figure 1:
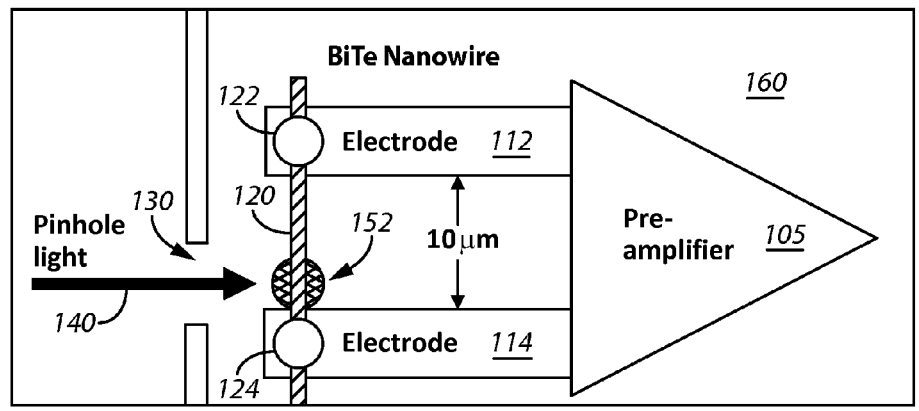
FIG. 1 comprises a schematic top view of a device as configured in accordance with various embodiments of the invention.

Referring now to the drawings and, in particular, to FIG. 1, an illustrative apparatus that is compatible with many of these teachings will now be presented. The apparatus includes an amplifier 105 and two electrodes 112 and 114 electrically connected to the amplifier 105. By one approach, the amplifier 105 may be a pre-amplifier in electrical communication with further circuitry that can amplify and handle signals from the pre-amplifier relating to the operation of the device, such as to collect and analyze the signals as data. Those skilled in the art will appreciate that the above-described processes and circuitry are readily enabled using any of a wide variety of available and/or readily configured platforms, including partially or wholly programmable platforms as are known in the art or dedicated purpose platforms as may be desired for some applications. The two electrodes 112 and 114 electrically connected to the amplifier 105 have a separation of about five micrometers to about thirty micrometers. A nanowire 120 is coupled across the two electrodes 112 and 114. The nanowire is bonded to the electrodes 112 and 114 at bonding points 122 and 124, respectively. By one approach, the nanowire comprises a single bismuth tellurium crystal. The chemical notation for a typical bismuth (Bi) tellurium (Te) crystal is $Bi_2Te_3$. It will be understood that the compound used, $Bi(2)Te(3)$, has the technical meaning of $[Bi(1-x)Sb(x)](2a)[Te(1-y)Se(y)](3b)$ where x, a, y, and b can assume any value between zero and 1. In other words $Bi(2)Te(3)$ designates the family of compounds that are used in thermoelectric energy conversion, and this family is well known to those familiar with the state of the art.

The focusing element 130 is disposed to admit photons 140 incident on the focusing element 130 onto the nanowire 120 to heat the nanowire 120. By one approach, the focusing element 130 is disposed to admit photons 140 to be incident onto the nanowire 120 adjacent to a nanowire contact 124 with one of the two electrodes 112 and 114. Such an approach can be advantageous because the electromagnetic energy is light and is dispersed in the electromagnetic field over distances of the order of the wavelength of the light. In the context of absorption at the nanoscale, the energy of a photon lands instantaneously in a single spot on the nanowire 120 and, in some approaches, on the thermoelectric junction because the thermoelectric junction has the highest resistivity. This absorption process is instantaneous, and after the energy evolves out of the landing spot onto the junction itself, the energy is disposed in a cross-section of the nanowire. The time constant for heat diffusion in the junction is approximately $d^2/D$.

The focusing element 130 may comprise any one of a number of different types of known technologies. In one approach, the focusing element includes at least one of a pinhole element or a miniature antenna. A miniature antenna, for example, may include lenses and/or mirrors that help to direct photons onto a particular portion of the nanowire 120. A pinhole element block lights and allows only a certain amount of light through to land on a particular portion of the nanowire 120.

When light impinges upon the nanowire 120, the amplifier is configured to detect a voltage change across the electrodes 112 and 114. A response to photon impingement on the nanowire 120 is the conversion of the photon energy into heat in the nanowire 120. That heating in turn affects the electrical property of the nanowire. In this case, a change in potential or a voltage across the nanowire 120 between the electrodes 112 and 114 is detected. The amplifier 105 is configured to detect a voltage change corresponding to energy levels corresponding to single photon energy levels. A single photon impinging upon the nanowire 120 can heat the nanowire enough to cause a detectable voltage change across the electrodes 112 and 114, such that the amplifier 105 in combination with supporting circuitry can interpret the voltage change as matching the energy level of the photon impinging upon the nanowire 120.

Figure 2:
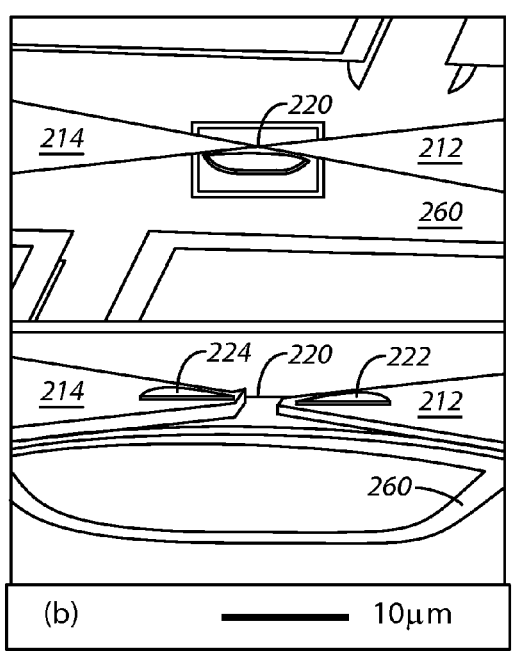
FIG. 2 comprises a perspective view of a portion of a device as configured in accordance with various embodiments of the invention.

By one approach, the electrodes 112 and 114 and the amplifier 105 are mounted on a substrate 160. The nanowire 120 is disposed across the electrodes 112 and 114 without direct contact with the substrate 160. Such an arrangement can also be seen in the approach illustrated in FIG. 2. In this approach, the electrodes 212 and 214 are disposed in contact with and are supported by the substrate 260. A nanowire 220 is disposed across the two electrodes 212 and 214 with electrical contact at the junctions 222 and 224 with the electrodes 212 and 214, respectively.

With reference again to FIG. 1, in various approaches, the electrodes are microfabricated with lithographic techniques on a dielectric substrate. The fabrication steps have been demonstrated by P. Jones, T. E. Huber, J. Melngailis, J. Barry, M. Ervin, T. S. Zheleva, A. Nikolaeva, L. Konopko, and M. J. Graf, "Electrical contact resistance of individual bismuth telluride nanowires." Proc. $25^{th}$ Int. Conf. Thermoelectrics held 2006 (IEEE, Piscattaway, 2007), pp. 367, which is hereby incorporated by reference as though fully rewritten herein. The nanowires 120 are suspended and not in contact with the dielectric substrate 160. The nanowires in various approaches are single crystal elements that do not bend easily; thus, because the electrode contacts are raised with respect to the substrate, the nanowire will not contact the substrate.

The electrodes can be made of materials that have poor thermal contact to the nanowire. When making this assumption, parameters relevant to the response of the detector were modeled. The nanowire resistance is R and the nanowire-electrode contact resistances is Rc. It is known that R~5 KΩ and Rc~100Ω for 200 nm BiTe nanowires. The relevant thermal parameter is T, the heat diffusion time from the nanowire into the electrode. The thermal parameter, τ, is roughly $l^2/D$, where l is the wire length and D is the diffusivity. In this case, $D=\kappa/C$, where κ is the thermal conductivity and C is the specific heat. Using the parameters appropriate for bulk BiTe, τ is found to be 2.5 μsec independent of wire diameter. The response parameters are $\Delta T=T_h-T_{ambient}$, with the temperature rise ΔT occurring following a photon absorption, and ΔV representing the voltage rise for the nanowire corresponding to the temperature rise.

For a single photon, ΔT=E(photon)/CV where the photon energy is E(photon)=$\hbar\omega$, the reduced Plank constant times the angular frequency of the photon. For a photon wavelength of λ~1 μm, the photon energy is E=1×10$^{-19}$ J and, based upon the above equations, above assumptions, and considering the volume heated and the specific heat, the temperature change is ΔT=0.1 K for 200 nm nanowires (ΔT~d−2). The thermopower of p-n BiTe junctions is about 200 μV/K, and therefore the voltage generated is 20 μV. The noise of the device has to be considered, and therefore it is advantageous to express the results in terms of noise equivalent power (NEP). NEP is the power that, if detected, would give rise to a signal that is barely distinguished from noise. Table 1 below shows the experimental results for various state-of-the-art bolometric room temperature detectors and the results of models in the case of a 200 nm BiTe nanowire and a 10 nm BiTe nanowire. Table 1 shows that the performance, as gauged by the NEP and speed, where smaller is better for both factors, is in the mid-range for a 200 nm BiTe nanowire and comparatively better for a 10 nm BiTe nanowire.

TABLE 1

Comparison of bolometric detector performances @ 300K

| Type | Material | 300K Noise Equivalent Power (NEP) $(pW/(Hz)^{1/2})$ | $F_m(Hz)$ | $\tau(sec)$ |
|---|---|---|---|---|
| Thermistor | Nb/Polymide/Si | 15 | 1000 | $1.5 \times 10^{-6}$ |
| Thermistor | $VO_3/Si_3N_4/Si$ | 12 | 1000 | $2.5 \times 10^{-3}$ |
| Thermopile | BiTe | 300 | 0 | $10^{-2}$ |
| 200 nm BiTe (model, w/o phonon confinement) | BiTe | 25 | 0 | $2 \times 10^{-6}$ |
| 10 nm BiTe (model, with phonon size effects) | BiTe | 0.04 | | About $2 \times 10^{-6}$ to $2 \times 10^{-4}$ |

There are two factors that have to be considered regarding the performance of the device. The first factor is the thermal mass that is proportional to the wire cross-section and improvements in fabrication. In using 10 nm diameter nanowires, the ΔT of the nanothermocouple is (200/10)2=400 times larger. Correspondingly, the estimate of NEP is changed to 0.04 relative to the 200 nm model, a small noise level for operating at about room temperature. The second factor is phonon size effects. It has been shown using individual Si nanowires that the phonon thermal conductivity in nanowires is decreased drastically, by about two orders of magnitude because the phonons are effectively stopped by the boundaries of the nanowires. In other words, the boundaries are rough to phonons. This effect is expected theoretically and has been observed in other nanowires such as bismuth. The entry for T in Table 1 reflects the uncertainty regarding this parameter.

Figure 3:
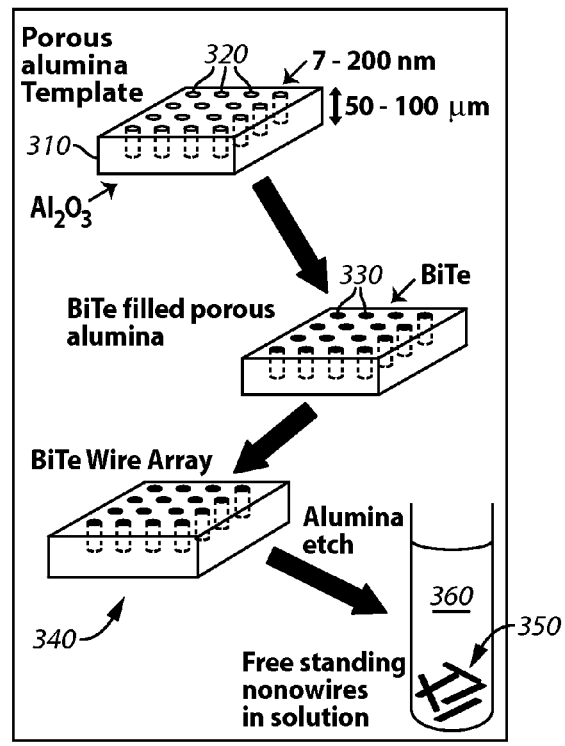
FIG. 3 comprises an illustration of a method for preparing nanowires as may be used in various embodiments of the invention as configured in accordance with various embodiments of the invention.

So configured, a nanothermocouple detector including a nanowire that is between about 5 micrometers to about 30 micrometers in length can be configured to have energy sensitivity high enough to sense the color of individual photons impinging upon the nanowire. One approach to preparation of individual nanowire will be described with reference to FIG. 3. In FIG. 3, a porous alumina template 310 includes pores 320 disposed throughout the template 310. By one approach, the template 310 comprises porous anodic aluminum oxide (PAAO) and is approximately 50 to 100 micrometers deep with the individual pores in the template being between 7 and 200 nanometers wide. The template 310 is designed to achieve crystalline orientation with the Bi trigonal axis (a high-symmetry direction) along the wire length, a high-density Bi phase (no empty channels in the template), and low contact resistance of the Bi nanowire array, generally less than $10^{-7}$ Ω·cm².

A bismuth tellurium melt 330 is injected into the porous alumina template 310 at high pressures, such as, for example, approximately one kBar. When cooled, the combined bismuth tellurium melt and porous alumina template create a bismuth tellurium wire array 340. The alumina is dissolved away resulting in free standing bismuth tellurium nanowires 350 floating in the dissolving solution 360. Individual of these nanowires can then be incorporated into a nanothermocouple detector as described above.

Figure 4:
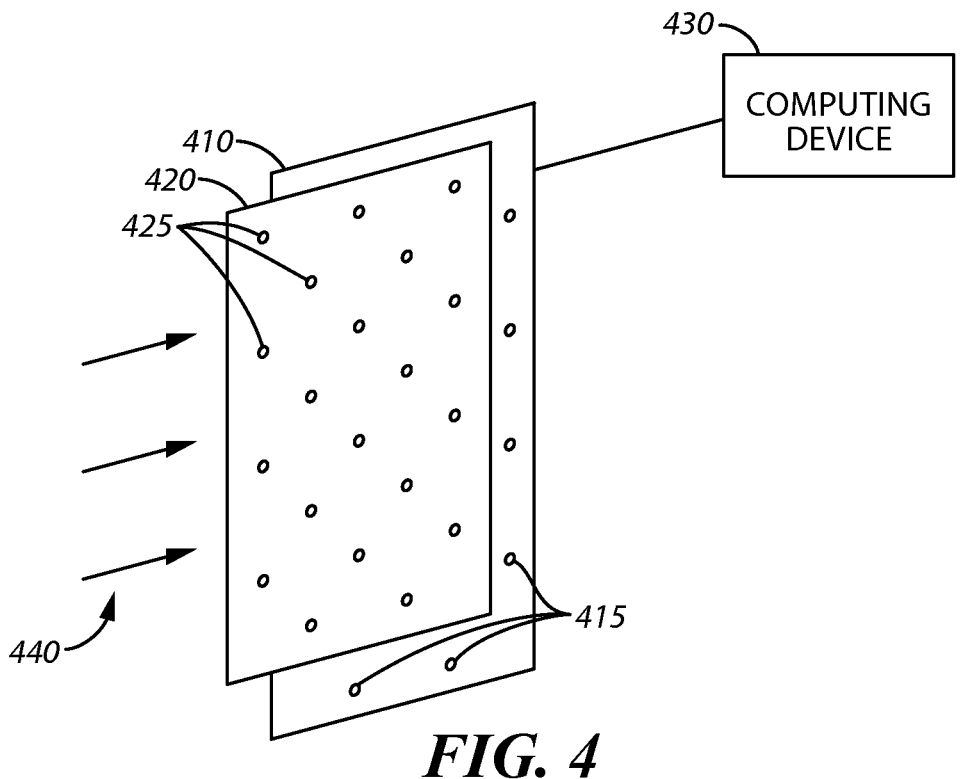
FIG. 4 comprises a flow chart of a method of using a device.

The teachings regarding the nanothermocouple detector described herein can be expanded such that larger devices incorporating the nanothermocouple detector can provide two dimensional images light energy impinging upon the detecting device with increased sensitivity. With reference to FIG. 4, an example of such an apparatus includes a detecting array 410 wherein individual detecting elements 415 of the detecting array 410 comprise nanothermocouple detectors such as those described above. Optics 420 include a focal plane wherein the detecting array 410 is disposed in the focal plane of the optics 420. By one approach, the optics 420 include individual optic elements 425 configured such that photons 440 collected by the optics 420 are directed to impinge upon the detecting array 410 for admittance by focusing elements of the individual detecting elements 415 that correspond to the individual optic elements 425. The optics 420 may comprises any number of devices including, for example, lenses, optic arrays, fiber optic elements, or the like disposed to collect and direct light toward the detecting array 410.

A computing device 430 is configured to be in communication with the detecting elements 415 of the detector array 410. Those skilled in the art will recognize and appreciate that such a computing device 430 can comprise a fixed-purpose hard-wired platform or can comprise a partially or wholly programmable platform. All of these architectural options are well known and understood in the art and require no further description here. The computing device 430 is configured to collect signals from the detector array 410 to create an image relating the radiation incident on the optics 420. For example, the computing device 430 can collect signals from individual amplifiers 105 from individual detecting elements 415 of the detector array 410. The individual signals correspond to individual voltage variations experienced by nanowires in the detecting elements 415. These voltage variations can then be correlated to the light energy impinging upon the optics at the particular focal point of the optics 420. Such a detecting array having color-level sensitivity can therefore provide an image showing minute energy changes across an area on which light is impinging.

Figure 5:
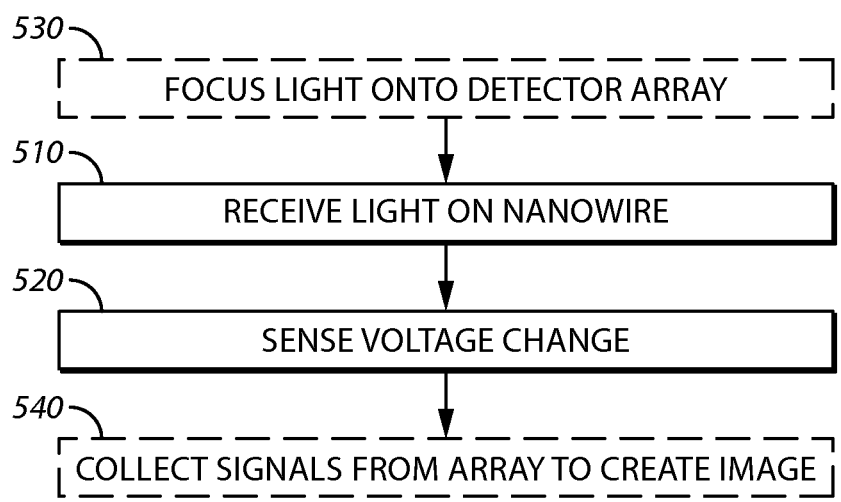
FIG. 5 comprises a perspective view of an array of devices as configured in accordance with various embodiments of the invention.

A method of using a nanothermocouple detector will be described with reference to FIG. 5. The method includes receiving 510 light through a focusing element on a nanowire coupled across two electrodes. The method also includes sensing 520 a voltage change in response to receiving the light through the focusing element on the nanowire with an amplifier electrically coupled to the two electrodes. As described above, the two electrodes may have a separation of between about 5 micrometers to about 30 micrometers across which a nanowire is disposed. By one approach, light is focused 530 through optics onto a detector array disposed in a focal plane of the optics such that photons collected by the optics impinge upon the detecting array. After sensing the voltage change in such an approach, computing device collects signals 540 from the detector array to create an image relating to the radiation energy incident upon the optics. Those skilled in the art will appreciate that the above-described processes for creating an image based on signals from a detector array are readily enabled using any of a wide variety of available and/or readily configured platforms, including partially or wholly programmable platforms as are known in the art or dedicated purpose platforms as may be desired for some applications.

Those skilled in the art will recognize that a wide variety of modifications, alterations, and combinations can be made with respect to the above described embodiments without departing from the scope of the invention. For instance, this technology can be applied to applications, other than for light sensing, for example, to energy sensing of other types of photons and/or high energy particles. Such modifications, alterations, and combinations are to be viewed as being within the ambit of the inventive concept.

What is claimed is:

1. An apparatus comprising:
   an amplifier;
   two electrodes electrically connected to the amplifier, the two electrodes having a separation of between about 5 micrometers to about 30 micrometers;
   a nanowire coupled across the two electrodes;
   a focusing element disposed to admit photons incident on the focusing element onto the nanowire to heat the nanowire;
   wherein the amplifier is configured to detect a voltage change across the electrodes in response to heating of the nanowire in response to photon impingement on the nanowire;
   wherein the focusing element is disposed to admit photons to be incident onto the nanowire adjacent to a nanowire contact with one of the two electrodes.

2. The apparatus of claim 1 wherein the nanowire comprises a single $Bi_2Te_3$ crystal.

3. The apparatus of claim 1 wherein the electrodes and the amplifier are mounted on a substrate and the nanowire is disposed without direct contact with the substrate.

4. The apparatus of claim 1 wherein the focusing element comprises at least one of a pinhole element or a miniature antenna.

5. The apparatus of claim 1 wherein the amplifier is configured to detect a voltage change corresponding to energy levels corresponding to single photon energy levels.

6. An apparatus comprising:
   a detecting array, wherein individual detecting elements of the detecting array comprise:
   an amplifier;
   two electrodes electrically connected to the amplifier, the two electrodes having a separation of between about 5 micrometers to about 30 micrometers;
   a nanowire coupled across the two electrodes;
   a focusing element disposed to admit photons incident on the focusing element onto the nanowire to heat the nanowire, wherein the focusing element is disposed to admit photons to be incident onto the nanowire adjacent to a nanowire contact with one of the two electrodes; and
   wherein the amplifier is configured to detect a voltage change in response to heating of the nanowire in response to photon impingement on the nanowire;
   optics having a focal plane wherein the detecting array is disposed in the focal plane such that photons collected by the optics impinge on the detecting array for admittance by focusing elements of the detecting array;
   a computing device in communication with the detecting elements of the detector array, the computing device configured to collect signals from the detector array to create an image relating to radiation incident on the optics.

7. The apparatus of claim 6 wherein the nanowire comprises a single $Bi_2Te_3$ crystal.

8. The apparatus of claim 6 wherein the electrodes and the amplifier are mounted on a substrate and the nanowire is disposed without direct contact to the substrate.

9. The apparatus of claim 6 wherein the focusing element comprises at least one of a pinhole element or a miniature antenna.

10. The apparatus of claim 6 wherein the amplifier is configured to detect a voltage change corresponding to energy levels corresponding to single photon energy levels.

11. A method comprising:
    receiving light through a focusing element on a nanowire coupled across two electrodes;
    sensing a voltage change in response to the receiving light through the focusing element on the nanowire coupled across two electrodes with an amplifier electrically connected to the two electrodes, the two electrodes having a separation of between about 5 micrometers to about 30 micrometers,
    wherein the focusing element is disposed to admit photons to be incident onto the nanowire adjacent to a nanowire contact with one of the two electrodes.

12. The method of claim 11 further comprising focusing light through optics onto a detector array disposed in a focal plane of the optics such that photons collected by the optics impinge on the detecting array for admittance by focusing elements of the detecting array.

13. The method of claim 12 further comprising collecting signals from the detector array to create an image relating to radiation incident on the optics.

14. The method of claim 11 wherein the nanowire comprises a single $Bi_2Te_3$ crystal.

15. The method of claim 11 wherein the electrodes and the amplifier are mounted on a substrate and the nanowire is disposed without direct contact to the substrate.

16. The method of claim 11 wherein the focusing element comprises at least one of a pinhole element or a miniature antenna.

17. The method of claim 11 wherein the amplifier is configured to detect a voltage change corresponding to energy levels corresponding to single photon energy levels.

* * * * *